May 4, 1954
B. G. WRIGHT
2,677,792
COIL SPACER FOR STATIONARY ELECTRICAL
INDUCTION APPARATUS
Filed Oct. 7, 1950
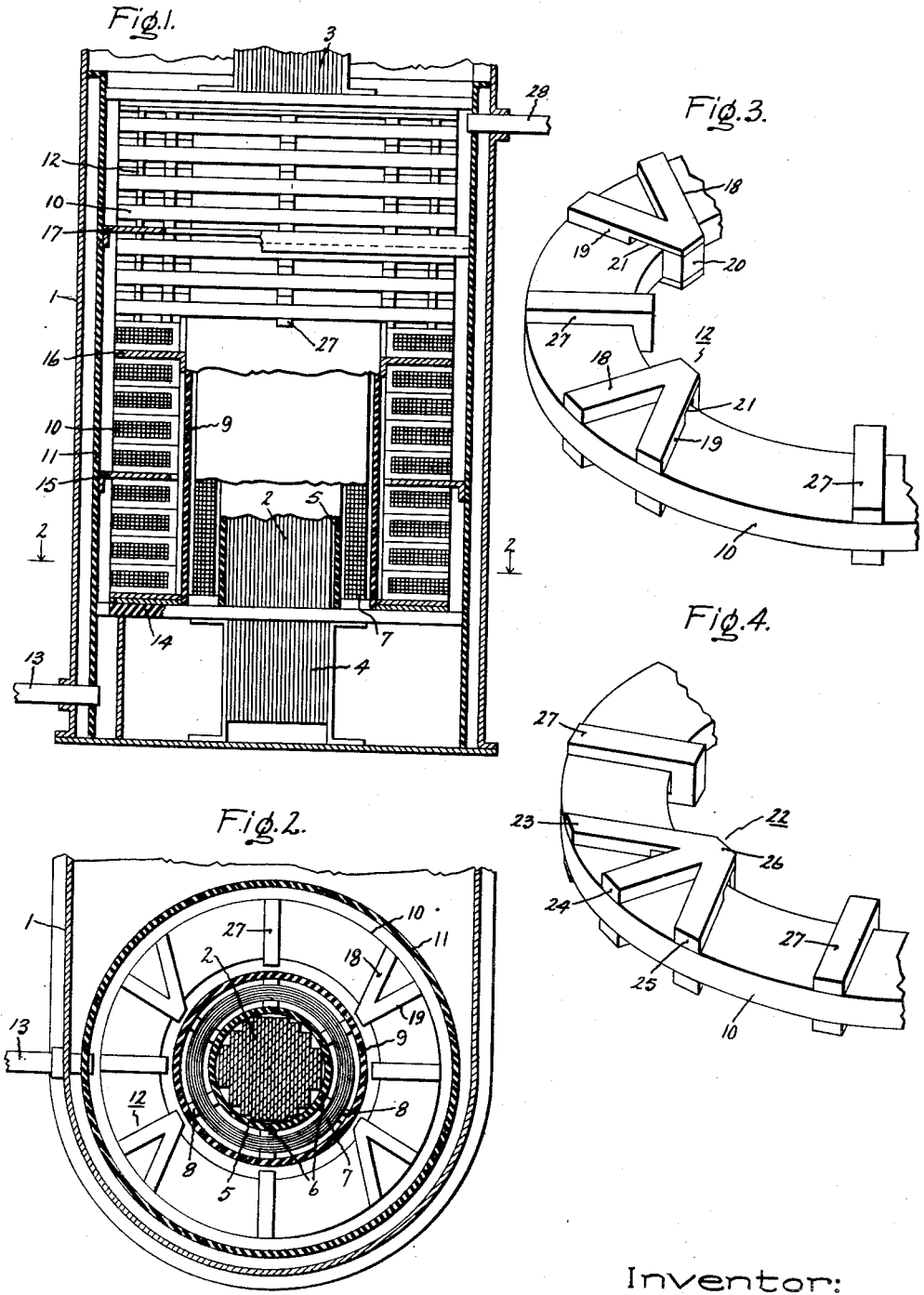
Inventor:
Burton G. Wright,
by Ernest Britton
His Attorney.

Patented May 4, 1954

2,677,792

UNITED STATES PATENT OFFICE 2,677,792

COIL SPACER FOR STATIONARY ELECTRICAL INDUCTION APPARATUS

Burton G. Wright, Pittsfield, Mass., assignor to General Electric Company, a corporation of New York Application October 7, 1950, Serial No. 188,984

7 Claims. (Cl. 317—208)

This invention relates to stationary electrical induction apparatus and more particularly to spacing means for the windings of such apparatus.

In the construction of electrical induction apparatus, such as transformers, frequent use is made of spirally wound disk-type coils which are assembled in stacked relation to one another to form an electrical winding. Each of such disk coils comprises a number of turns of a conductor spirally wound in the same plane. To form a composite electrical winding, such as the high voltage winding of a transformer, a number of such disk-type coils are stacked in superposed relation and electrically interconnected.

In the case of large size installations of electrical induction apparatus, using such disk-type coils, it is the general practice to provide a liquid cooling means for the windings of the apparatus. In order to obtain proper circulation of the cooling fluid in proximity to the disk-type coils, it is the general practice to provide radial spacer members between the coils in order to properly space the coils apart from one another in an axial direction so that the cooling fluid may pass between the coils. For example, a U-shaped spacer member of the type shown in co-pending application Serial No. 143,733 of Wilfred J. Bilodeau, filed February 11, 1950, and assigned to the same assignee as the present application, may be used to space the disk coils apart. In the case of the U-shaped spacer member, one arm of the U is positioned on the upper surface of a given coil, the other arm of the U is positioned on the lower surface of the same coil, and the cross-piece of the U connects the two legs together. Thus, the U-shaped spacer member slips over the coil surface, with the coil being sandwiched into the hollow portion of the U. Alternatively, instead of using U-shaped spacer members, simple rectangular-shaped spacer members extending radially across the respective disk coils may be used, without having a cross-connection such as is employed in the case of the U-shaped spacer member.

One difficulty which has been encountered in connection with radial-type spacers of the kind hereinbefore described is that of providing proper spacer separation at the outer circumference of the coil and, at the same time, proper spacer separation at the inner circumference of the coil. In order to maintain an adequate coil support, a certain minimum distance between spacers must be maintained at the line of greatest separation of spacers. This line of greatest separation is usually at the outside circumference of a circular coil. Since the spacers extend radially across the coil, the distance between a given pair of adjacent spacers is naturally greater at the outer circumference of the coil than at the inner circumference of the coil. When the distance between spacers at the outer circumference of the coil is reduced sufficiently to provide adequate coil support, it frequently happens that the ends of the same spacers at the inner circumference of the coil will be too close to permit necessary electrical connections which must be made at the inner circumference of the coil, and also to permit the necessary free circulation of cooling fluid about the coil. Thus, the problem exists of obtaining a greater distance between spacers at the inside circumference of the coil and of still providing adequate support to the coil at the outer circumference of the coil.

It is an object of this invention, therefore, to provide a new and improved spacer for use with disk-type coils of stationary electrical induction apparatus which will permit adequate separation between spacers at the inner circumference of the disk coils and, at the same time, provide adequate support for the coils at the outer circumference of the coils.

In accordance with this objective, this invention provides a V-shaped spacer construction in which the apex of the V is positioned at the inner circumference of the coil, while the two arms of the V extend radially across the coil. In a modified construction, I provide a double V- or W-shaped spacer, with the apex of the W being positioned at the radially inner circumference of the coil, while the arms of the W extend radially across the coil surface.

The features of this invention which I believe to be novel are set forth with particularity in the appended claims. My invention itself, however, both as to its organization and use, together with further objects and advantages thereof, may best be understood by reference to the following description taken in connection with the accompanying drawing in which Fig. 1 represents a front elevation, partially cut away, of a transformer having spacers constructed in accordance with my invention; Fig. 2 is a sectional view along line 2—2 of the structure shown in Fig. 1; Fig. 3 is an enlarged detail view showing a partially cut-away disk coil having spacer means in accordance with my invention; while Fig. 4 is a detail view showing a partially cut-away disk coil having a modified form of spacer in accordance with my invention.

Referring now to the drawing, there is shown in Fig. 1 a transformer with an outer tank or casing 1 in which there is contained a magnetic core having winding legs 2 (only one of which is shown) connected by yoke members 3 and 4. Concentrically arranged about each of the leg members 2 are high and low voltage windings, which will be described hereinafter in more detail. Since the windings about each of the respective leg members 2 are the same, only one leg member with its associated windings is shown. However, it will be understood that the transformer has at least two such legs 2, each having an identical winding arrangement.

Concentrically mounted about winding leg 2 is an axial insulating cylinder 5 which is separated by axial spacer members 6 from a low voltage winding 7. Low voltage winding 7 is wound in the form of a cylinder, and is separated by axial spacer members 8 from concentric insulating cylinder 9. Spaced radially outwardly from insulating cylinder 9 are disk coils 10 which are stacked axially in superposed relation, and constitute the high voltage winding of the transformer. An insulating cylinder 11 is positioned radially outwardly of disk coils 10. My spacer members 12 extend radially across the disk coils 10 and, as will best be seen in Fig. 3, each spacer member 12 is so constructed that it embraces the upper and lower surface of a given disk coil. My spacer members 12 will be described in more detail hereinafter.

In the embodiment shown in Figs. 1 and 2 cooling liquid enters the transformer casing through a pipe or conduit 13 at the lower end of the casing and thence passes up through a passage in diaphragm member 14. The cooling liquid then passes radially inwardly across the four lowermost disk coils shown in the drawing until it abuts against insulating cylinder 9 which is positioned radially inwardly of the disk coils 10. A zig-zag type of liquid flow is obtained across the disk coils due to the use of radial flange members similar to those shown at 15, 16, and 17 which alternately abut insulating cylinders 9 and 11. It will be noted that radial flange member 15 is attached to the radially inner surface of insulating cylinder 11 but does not extend quite to the outer surface of insulating cylinder 9. Due to this construction a small passage for liquid flow is left between flange member 15 and insulating cylinder 9. Hence the liquid flow is radially inwardly across the four lowermost disk coils, as has been previously mentioned, with this liquid passing through the aperture between flange 15 and insulating cylinder 9 so that the liquid passes up into the next tier of disk coils where a radially outward flow of oil occurs. Flange 16 is attached to the outer surface of insulating cylinder 9 and does not quite extend radially outwardly as far as insulating cylinder 11. Hence the liquid flow across the second tier of disk coils passes radially outwardly and up into the subsequent tier of disk coils by means of the aperture between flange 16 and insulating cylinder 11. Thus, it will be seen that the liquid flow with respect to the disk coils is such that it flows radially inwardly for one group of disk coils and radially outwardly for the superposed group of disk coils. This type of liquid flow is conventional in stationary electrical induction apparatus and is known as a "zig-zag" type of liquid flow. A conduit 28 is provided at the upper end of tank 1 to conduct the cooling liquid away from the tank to any suitable cooling device which may be provided exteriorly of tank 1.

It will be seen that my spacer members 12 maintain the disk coils 10 spaced apart in an axial direction sufficiently to permit a flow of cooling liquid across the upper and lower surface of each of the coils. As can best be seen in Figs. 2 and 3, each of my spacer members 12 is of substantially a V-shape having two arms 18 and 19 at an acute angle with respect to one another and meeting in an apex. The apex of each spacer is always positioned at the radially inner circumferential edge of the respective disk coil with which it is used. In accordance with my preferred construction, each spacer member 12 embraces both the upper and lower surface of a given disk coil, since each spacer 12 is provided with two pairs of arms 18 and 19, one pair of arms 18 and 19 extending across the upper surface of a given disk coil, while the other pair of arms 18 and 19 extends across the lower surface of a given disk coil. The two pairs of arms 18 and 19 are joined together at the apex of the spacer 12 by a back portion or juncture member 20. One of the respective arms 18 or 19 is provided with a slot 21 near the apex of the spacer member in order to permit fluid flow through the arms of the spacer member. The other arm is unslotted.

In accordance with the embodiment of my spacer member shown in Fig. 3, the disk coil 10 may be slipped into the space between the upper pair of arms 18 and 19 and the lower pair of arms 18 and 19, in effect sandwiching the coil between the upper pair of arms and the lower pair of arms.

It can be seen that the use of V-shaped spacer members as shown in the drawing and described in my specification provides adequate coil support at the radially outer edge of the disk coils 10 and also at the radially inner circumferential edge of the disk coils 10. As has been explained hereinbefore, it is desirable to maintain a certain minimum spacing of the spacer members at the radially outer circumference of the disk coils without providing a crowded arrangement of the spacers at the radially inner circumference of the disk coils. The use of my V-shaped spacer members permits adequate coil support by the spacer members at the outer circumferential edge of the disk coils by maintaining the distance between spacers at the radially outer edge less than the maximum permissible spacer separation. At the same time, my V-shaped spacer maintains a sufficiently spaced-apart arrangement at the inner circumference to permit easy passage of the cooling fluid and also to permit passage of any electrical connectors which may be necessary at the inner circumference of the coils 10.

There is shown in Fig. 4 a modified form of spacer member 22 based upon the same principle as that previously described but differing from the spacer shown in Figs. 2 and 3 in that the spacer of Fig. 4 has three arm members 23, 24 and 25 radiating from a common apex in a W shape. Each spacer member 22 is provided with a double set of arms 23, 24, and 25, one set of arms passing radially across the upper surface of a given disk coil, while the other set of arms passes across the lower surface of the same disk coil. The two sets of arms, namely those for the upper and lower coil surfaces, are joined together at the apex of the spacer by a back member 26.

The outer arm members 23, and 25 are each provided with a slot near the apex of the spacer for permitting fluid flow through the arm. The middle arm 24 is preferably not slotted.

It will be noted that in both the constructions of Figs. 3 and 4, I may alternately position standard rectangular-shaped spacer members and my V- and W-shaped spacer members around the periphery of the disk coil. Thus, in the embodiment shown in Fig. 3, I alternate the use of the conventional rectangular-shaped spacer members 27 and my V-shaped spacer members, while in the embodiment of Fig. 4 I alternate the use of the conventional rectangular-shaped spacer members 27 and my W-shaped spacer members. Use of the conventional spacer alternately with the V- or W-shaped spacer permits a more uniform spacing arrangement at the inner circumference of the coil, since use of only V-shaped or W-shaped spacers alone would result in the spacers being more closely positioned together at the outer circumference than at the inner circumference whereas the use of either my V- or W-shaped spacer in combination with a conventional type of spacer as shown in Figs. 3 and 4, permits a closer equalization of the spacing at the inner and outer circumference.

My spacer members may be made of any suitable material. I have found that spacers built of laminated plyboard give very satisfactory service.

Thus, it can be seen that I have provided a new and improved type of spacer member for use with disk-type coils of electrical induction apparatus. The use of my spacer members permits a sufficiently close spacing of the spacer members at the radially outer circumference of the disk coils without crowding the spacer members together at the radially inner circumference of the disk coils. This new and improved spacer arrangement facilitates the flow of cooling liquid and also facilitates the passage of electrical connections at the inner circumference of the disk coils.

While there have been shown and described particular embodiments of my invention, it will be obvious to those skilled in the art that various changes and modifications can be made therein without departing from the invention, and, therefore, it is aimed in the appended claims to cover all such changes and modifications as fall within the true spirit and scope of the invention.

What I claim as new and desire to secure by Letters Patent of the United States is:

1. In combination, a stationary electrical induction apparatus having a plurality of disk-type electrical coils stacked in superposed relation, and a plurality of radially-extending spacer members between said coils to maintain adjacent coils in spaced apart relationship, each of said spacer members having a first and second set of arms extending respectively across the opposite surfaces of a given disk coil, the respective arms in each of said sets of arms extending angularly with respect to one another and meeting in a common apex, each of said two sets of arms defining a pair of planes parallel to the planes defined by said other set of arms, and a juncture member perpendicular to the planes defined by said first and second sets of arms, and connecting together the apex of each of said respective sets of arms to the apex of said other set of arms, an outer arm of each of said sets of arms having at said apex an aperture which extends for a substantial portion of the length of said outer arm, another arm of each of said sets of arms being solid and having continuous uninterrupted coil-supporting surfaces each extending in one of said parallel planes from said juncture member to the opposite end portion of said other arm.

2. In combination, a stationary electrical induction apparatus having a plurality of disk-type electrical coils stacked in superposed relation, and a plurality of radially-extending V-shaped spacer members between said coils to maintain adjacent coils in spaced apart relationship, the apex of each of said V-shaped spacer members lying at the radially inner circumference of the disk coils to which it is adjacent, the arms of each of said spacers which define said V shape extending in the same radial plane as each other perpendicular to the axis of said disk coils, one arm of each of said spacers having at said apex an aperture which extends for a substantial portion of the length of said one arm, the other arm of each of said spacers being solid and having continuous, uninterrupted coil-supporting surfaces each extending from said apex to the opposite end portion of said other arm.

3. In combination, a stationary electrical induction apparatus having a plurality of disk-shaped electrical coils stacked in superposed relation, and V-shaped radially-extending spacer members for maintaining adjacent disk coils in an axially spaced apart relation, each of said V-shaped spacer members comprising a first pair of arms connected together to form a V-shape, said first pair of arms extending radially across the same surface of a given disk coil, each of said V-shaped spacer members also having a second pair of arms connected together to form a V-shape, said second pair of arms extending radially across an opposite surface of the same disk coil across which said first pair of arms extend the apex of each of said pairs of V-shaped arms being positioned at the radially inner circumference of said disk coils, and a juncture member perpendicular to the respective planes of said first pair of arms and said second pair of arms connecting together said two pairs of arms at the apex of each of said pairs of arms, one arm of each of said spacers having at said apex an aperature which extends for a substantial portion of the length of said one arm, the other arm of each of said spacers being solid and having continuous, uninterrupted coil-supporting surfaces each extending from said apex to the opposite end portion of said other arm.

4. A spacer member for disk-type coils of stationary electrical induction apparatus comprising a spacer member having a first and a second set of arms, the respective arms in each of said sets of arms extending angularly with respect to one another and meeting in a common apex, each of said two sets of arms defining a pair of planes parallel to the planes defined by said other set of arms, and a juncture member perpendicular to the planes defined by said first and second set of arms, and connecting together the apex of each of said respective sets of arms to the apex of said other set of arms, an outer arm of each of said sets of arms having at said apex an aperture which extends for a substantial portion of the length of said outer arm, another arm of each of said sets of arms being solid and having continuous, uninterrupted coil-supporting surfaces each extending in one of said parallel planes from said juncture member to the opposite end portion of said other arm.

5. A spacer member for disk-type coils of stationary electrical induction apparatus comprising a V-shaped member having a first set of arms forming a V-configuration, a second set of arms also forming a V-configuration, said two sets of arms defining planes respectively parallel to one another, but spaced apart from one another, said respective sets of V-shaped arms being similarly oriented, corresponding arms of the respective sets of arms being in superposed relation, and a juncture member perpendicular to the respective planes of said two sets of arms connecting said two sets of arms together at their respective apexes, one arm of each of said V-shaped sets of arms having at said apex an aperture which extends for a substantial portion of the length of said one arm, the other arm of each of said V-shaped sets of arms being solid and having continuous, uninterrupted supporting surfaces each extending in one of said parallel planes from said juncture member to the opposite end portion of said other arm.

6. A spacer member for disk-type coils of stationary electrical induction apparatus comprising a W-shaped member having a first set of arms comprising two outer arms and an inner arm, the outer arms extending angularly with respect to the inner arm and having one end joined to one end of said inner arm thereby forming a W-configuration, a second set of arms similarly forming a W-configuration, said two sets of arms defining planes respectively parallel to one another but spaced apart from one another, said respective sets of W-shaped arms being similarly oriented, correspondings arms of the respective sets of arms being in superposed relation, and a juncture member perpendicular to the respective planes of said two sets of arms connecting said two sets of arms together at their respective apexes, each of the two outer arms in each of said sets of arms having at said apex an aperture which extends for a substantial portion of the length of each of said outer arms, the inner arm of each of said sets of arms being solid and having a pair of continuous, uninterrupted supporting surfaces each extending in one of said parallel planes from said juncture member to the opposite end portion of said inner arm.

7. In combination, a stationary electrical induction apparatus having a plurality of disk-type electrical coils stacked in superposed relation, and a plurality of radially-extending spacer members between said coils to maintain adjacent coils in spaced apart relationship, each of said spacer members having at least two arms lying in a plane perpendicular to the axis of said coils, said arms diverging from a common apex adjacent the inner periphery of said coils and extending radially outwardly between the adjacent surfaces of a pair of adjacent disk coils, an outer arm of each of said spacers having at said apex an aperture which extends for a substantial portion of the length of said outer arm, the other arm of each of said spacers being solid and having continuous, uninterrupted coil-supporting surfaces each extending from said apex to the opposite end portion of said other arm.

References Cited in the file of this patent

UNITED STATES PATENTS

| Number | Name | Date |
|---|---|---|
| 974,167 | Mayer | Nov. 1, 1910 |
| 1,224,225 | Sieber | May 1, 1917 |
| 1,255,947 | Thordarson | Feb. 12, 1918 |
| 1,338,884 | Thordarson | May 4, 1920 |
| 1,549,525 | Cooney | Aug. 11, 1925 |
| 1,624,896 | Veitch | Apr. 12, 1927 |
| 2,467,804 | Beymer | Apr. 19, 1949 |

FOREIGN PATENTS

| Number | Country | Date |
|---|---|---|
| 405,512 | France | Jan. 6, 1910 |